(12) United States Patent
Saunders et al.

(10) Patent No.: US 9,177,189 B2
(45) Date of Patent: *Nov. 3, 2015

(54) SYSTEM AND METHOD FOR DATA TRANSFER THROUGH ANIMATED BARCODES

(71) Applicant: BlackBerry Limited, Waterloo (CA)

(72) Inventors: Christopher O'Byrne Saunders, North Sydney (AU); Terrill Mark Dent, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/160,683

(22) Filed: Jan. 22, 2014

(65) Prior Publication Data

US 2014/0131446 A1  May 15, 2014

Related U.S. Application Data

(63) Continuation of application No. 13/693,774, filed on Dec. 4, 2012, now Pat. No. 8,636,217, which is a continuation of application No. 12/885,862, filed on Sep. 20, 2010, now Pat. No. 8,342,406.

(51) Int. Cl.
    *G06K 7/10* (2006.01)
    *G06K 7/14* (2006.01)
    *G06K 19/06* (2006.01)

(52) U.S. Cl.
    CPC ............ *G06K 7/1434* (2013.01); *G06K 7/1095* (2013.01); *G06K 7/10821* (2013.01);
    (Continued)

(58) Field of Classification Search
    CPC ............ G06F 17/2247; G06F 19/3406; G06F 19/366; G06F 21/43; G06F 3/0317; G06F 3/03543; G06K 7/1095; G06K 19/06009; G06K 19/06028; G06K 19/06037; G06K 1/121; G06K 1/14; G06K 2017/0067; G06K 2019/00
    USPC ............ 235/462.01–462.45, 472.01–472.03, 235/454, 492, 455
    See application file for complete search history.

(56) References Cited

U.S. PATENT DOCUMENTS 6,802,454 B1 * 10/2004 McMurtry et al. ............ 235/494
7,344,080 B2 * 3/2008 Vinogradov et al. ..... 235/462.11
(Continued)

FOREIGN PATENT DOCUMENTS

EP  1178421 A2  2/2002
EP  2431912    3/2012

OTHER PUBLICATIONS

QR Code features | QR Code.com; http://www.denso-wave.com/qrcode/qrfeature-e.html; Accessed on the Internet at least as early as Oct. 26, 2009.
(Continued)

*Primary Examiner* — Thien M Le
(74) *Attorney, Agent, or Firm* — Thomas Grzesik; Fleit Gibbons Gutman Bongini & Bianco P.L.

(57) ABSTRACT

A system and method are provided for transferring data to a mobile device through animated barcodes. The mobile device scans, with a barcode reader, at least a first barcode and then scans at least a second barcode, whereby the barcodes are shown on a display. The display is in an open-loop relationship with the mobile device. The mobile device decodes the at least first and second barcodes to extract a first data portion and an associated first sequence identification, and a second data portion and an associated second sequence identification. The mobile device combines the first and second data portions according to the associated sequence identifications.

45 Claims, 14 Drawing Sheets

(52) U.S. Cl.
CPC ............ *G06K7/1417* (2013.01); *G06K 7/1465* (2013.01); *G06K 19/06046* (2013.01); *G06K 19/06112* (2013.01)

(56) References Cited

U.S. PATENT DOCUMENTS

| | | | |
|---|---|---|---|
| 7,428,996 B2* | 9/2008 | Pintsov et al. | 235/462.09 |
| 7,543,748 B2* | 6/2009 | Kiliccote | 235/462.1 |
| 7,571,864 B2* | 8/2009 | Kiliccote | 235/494 |
| 7,575,168 B2 | 8/2009 | Suomela et al. | |
| 7,648,072 B2* | 1/2010 | Yada | 235/462.09 |
| 8,146,816 B2 | 4/2012 | Kuyper-Hammond et al. | |
| 8,342,406 B2* | 1/2013 | Saunders et al. | 235/462.01 |
| 8,636,217 B2* | 1/2014 | Saunders et al. | 235/462.01 |
| 2003/0042317 A1 | 3/2003 | Behm et al. | |
| 2003/0236680 A1 | 12/2003 | Holoubek | |
| 2005/0147981 A1 | 7/2005 | Yamakawa et al. | |
| 2006/0049261 A1 | 3/2006 | Stadtler | |
| 2006/0071077 A1 | 4/2006 | Suomela et al. | |
| 2007/0145137 A1 | 6/2007 | Mrowiec | |
| 2007/0152058 A1 | 7/2007 | Yeakley et al. | |
| 2011/0037700 A1 | 2/2011 | Chatow et al. | |
| 2012/0029994 A1 | 2/2012 | Barkan et al. | |
| 2012/0054093 A1 | 3/2012 | Schamer et al. | |

OTHER PUBLICATIONS

Fichter, Uli; Partial search report from corresponding European Application No. 101776136; search completed Feb. 9, 2011.
Macro PDF417 Barcode—.NET Windows Forms; http://wwwneodynamic.com/barcodes/Macro_PDF417_Barcode_net_windows_forms.aspx; retrieved from the Internet on Aug. 1, 2012.
Web archive of: Macro PDF417 Barcode—Net Windows Forms; http://web.archive.org/web/20080609202253/http://www.neodynamic.com/barcodes/Macro_PDF417_Barcode_net_windows_forms.aspx; available on the internet as early as Jun. 9, 2008; retrieved from the internet Aug. 1, 2012.
Canadian Office Action dated Feb. 3, 2015, received for Canadian Application No. 2,752,887.

\* cited by examiner

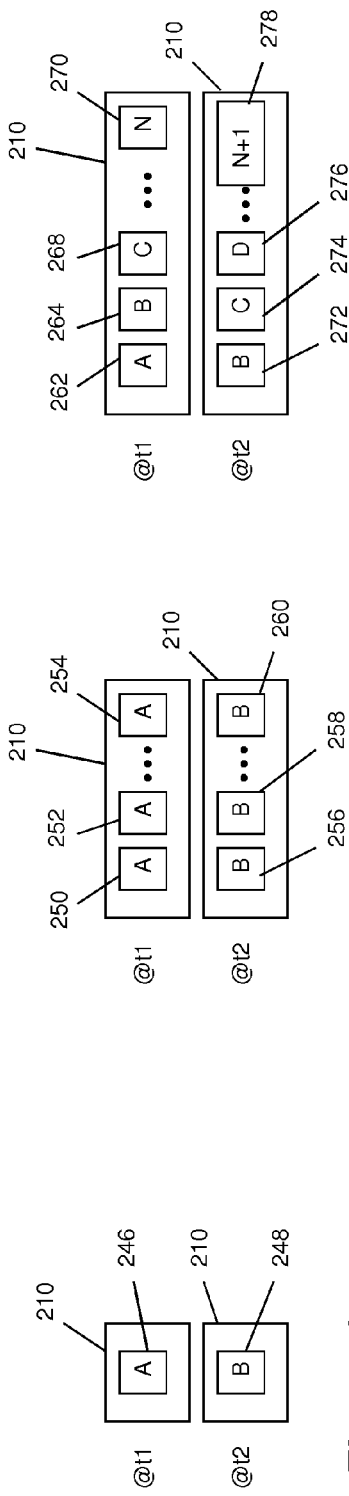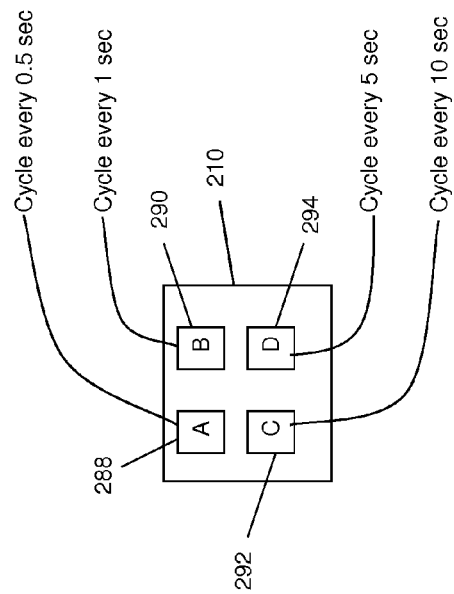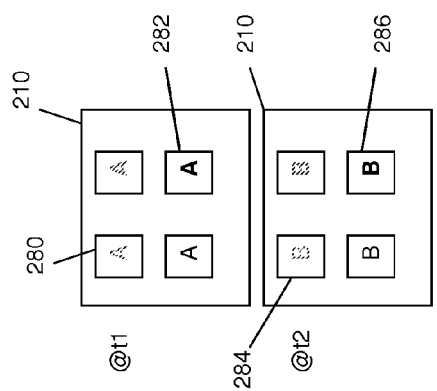

SYSTEM AND METHOD FOR DATA TRANSFER THROUGH ANIMATED BARCODES

CROSS-REFERENCE TO RELATED APPLICATIONS

This application is a Continuation of U.S. patent application Ser. No. 13/693,774 filed on Dec. 4, 2012, which is a Continuation of U.S. patent application Ser. No. 12/885,862 filed on Sep. 20, 2010, now U.S. Pat. No. 8,342,406, issued on Jan. 1, 2013, the entire contents of which are incorporated by reference.

TECHNICAL FIELD

The following relates generally to the transfer of data through barcodes.

DESCRIPTION OF THE RELATED ART

The use of barcodes to transfer data is well known. More recently, mobile devices with cameras have also been used to capture images of barcodes to transfer data. For example, a mobile device can capture an image of a one-dimensional or two-dimensional barcode on an advertisement to transfer data, such as a website address or contact information. In other words, the mobile device can take the image of a barcode and extract the coded data.

Typically the amount of data transfer to the mobile device is limited due to the abilities of the mobile device, such as the camera's image resolution and the field of view of the camera. It can also be difficult to transfer larger data amounts since the amount of data stored in a barcode is also limited.

BRIEF DESCRIPTION OF THE DRAWINGS

Embodiments will now be described by way of example only with reference to the appended drawings wherein:

FIG. 9 is an example schematic diagram of a display screen showing a single animated barcode area at different times.

FIG. 10 is an example schematic diagram of a display screen showing multiple animated barcode areas at different times.

FIG. 11 is an example schematic diagram of a display screen showing multiple animated barcode areas at different times, each animated barcode area showing different instances of a barcode in a barcode series.

FIG. 12 is an example schematic diagram of a display screen showing multiple animated barcode areas at different times, each animated barcode area showing a different setting of a barcode in a barcode series.

FIG. 13 is an example schematic diagram of a display screen showing multiple animated barcode areas at different times, each animated barcode area showing a different setting and instance of a barcode in a barcode series.

DETAILED DESCRIPTION

Figure 1:
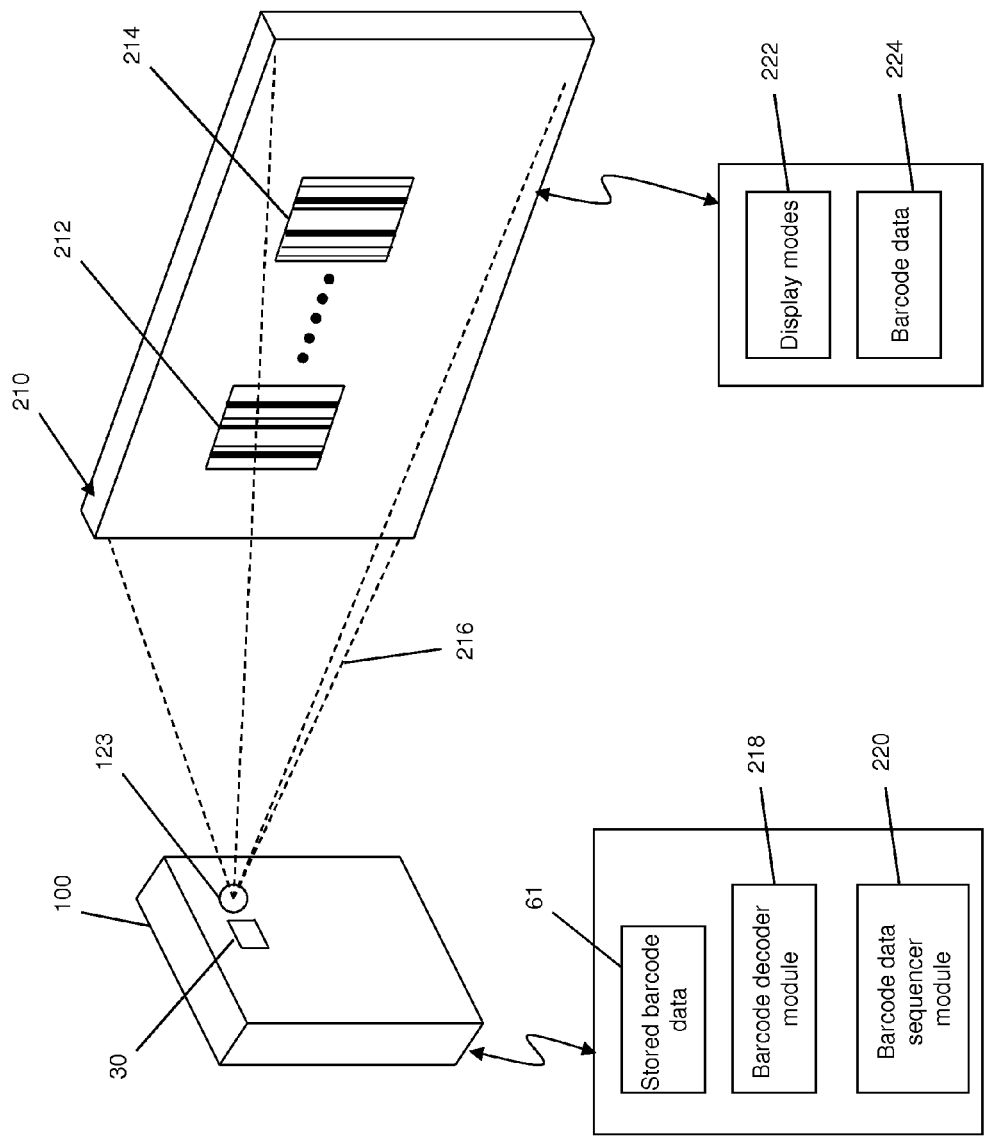
FIG. 1 is a schematic diagram of a mobile device and a display screen showing barcodes.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

Visually coded images contain data. A device can be used to scan or view a visually coded image to extract data. Non-limiting examples of visually coded images are barcodes, which come in various forms (e.g. one-dimensional and two-dimensional barcodes). Visually coded images, herein referred to as barcodes, are a convenient way to transfer small amounts of data, such as a web address, contact information, latitude and longitude coordinates, etc. to a mobile scanner or reader, such as a mobile device (e.g. smart phone). A mobile reader on a smart phone is typically a camera suitable for taking an image of a barcode. Other types of barcode readers may also be used. However, due to camera resolution limits from sensor size and lens construction, the amount of information encoded in a barcode is typically small. This allows common smart phone cameras to have enough resolution to properly capture the pixel discrepancies to decode the barcode. In some cases, the amount of information able to be transferred through a barcode is in the order of a few hundred bytes.

There may times when it is desirable to transfer more information to a mobile device through visually encoded images or barcodes. For example, there may be a video display as part of an advertisement that sends data to people with mobile devices through barcodes. Detailed product information and other data (e.g. ring tones, desktop wall paper, documents, games, etc.) may be transferred from a barcode on the display to a user with a mobile device. An advertisement for example, may wish to give a "gift" of a ringtone to a user through barcodes. These applications would be made possible if more data could be transferred.

By dividing the data into smaller portions that can be encoded into a barcode, multiple barcodes are created. The collection of these multiple barcodes is a barcode series. The barcodes are displayed one at a time in an animation for a mobile device to scan or capture. 2D animated barcodes can be considered "3D barcodes" since they vary over time, in addition to the x and y axes. Once all the barcodes in the barcode series have been scanned, the mobile device then combines the data decoded from the multiple barcodes to generate the original data.

In general, a system and a method are provided for transferring data to a mobile device through animated barcodes. The mobile device scans, with a barcode reader, at least a first barcode and then scans at least a second barcode, whereby the barcodes are shown on a display. The display is in an open-loop relationship with the mobile device. The mobile device decodes the at least first and second barcodes to extract a first data portion and an associated first sequence identification, and a second data portion and an associated second sequence identification. The mobile device combines the first and second data portions according to the associated sequence identifications.

In another aspect, the barcode reader is a camera, wherein the camera scans each of the barcodes by capturing an image of each barcode. In yet another aspect, the barcodes are two-dimensional barcodes. In yet another aspect, the mobile device displays the number of barcodes scanned. In another aspect, the at least first barcode and the at least second barcode are part of a barcode series, whereby the respective data portions from all the barcodes in the barcode series are able to be combined to form a complete data set. In another aspect, the mobile device extracts a total number of barcodes in the barcode series. In another aspect, the mobile device displays any one of: the total number of barcodes in the barcode series; the number of barcodes that have not yet been scanned; or the combination thereof. In another aspect, upon the mobile device scanning and decoding all the barcodes in the barcode series, the mobile devices displays an indicator that all the barcodes have been acquired. In another aspect, the mobile device determines a time remaining to completely acquire the barcodes in the barcode series by determining a rate at which the mobile device has previously acquired the barcodes, and then determining a product of the number of barcodes that have not yet been scanned and the rate. In another aspect, the data portions are combined by concatenating the data portions in sequential order according to the associated sequence identifications.

A system and a method are also provided for transferring data from a display to one or more mobile devices. The display has one or more display modes and shows one or more animated barcode areas. Each animated barcode area continuously displays two or more barcodes, one at a time, and each barcode includes an encoded data portion and an associated sequence identification for combining the multiple data portions. The barcodes are able to be scanned by one or more mobile devices, wherein the one or more mobile devices and the display are in an open-loop relationship.

In another aspect, the one or more display modes include showing at least two animated barcode areas, wherein the animated barcode areas simultaneously display the barcodes. In another aspect, the barcodes are part of a barcode series, whereby the respective data portions from all the barcodes in the barcode series are able to be combined to form a complete data set. In another aspect, the one or more display modes include at least two animated barcode areas, the animated barcode areas simultaneously displaying barcodes belonging to the same barcode series. In another aspect, each of the animated barcode areas are synchronized to simultaneously display the same barcodes. In another aspect, each of the animated barcode areas simultaneously display different barcodes from each other. In another aspect, each of the animated barcode areas is associated with a different display setting for displaying barcodes. The display settings include any one of: contrast, brightness, resolution, and the rate at which the barcodes in the respective animated barcode area are continuously cycled. In another aspect, the barcode series comprise two or more sets of barcodes, wherein one set of barcodes is displayed in one animated barcode area, and a different set of barcodes is displayed in another animated barcode area.

FIG. 1 shows an example embodiment of a mobile device 100 viewing one or more barcodes 212, 214 on a display 210. The display 210 may be an active display, such as a screen or monitor. As represented by dotted lines 216, a camera 123 on the mobile device 100 has lines of sight 216 that include the barcodes 212, 214. In other words, the camera 123 is able to view and capture images of one or more barcodes 212, 214. The mobile device 100 may also be equipped with a camera light or flash device 30 to be used with the camera 123.

Although a camera 123 is shown on the mobile device 100, other barcode scanning or barcode reading technology can also be used. For example, a pen-type reader, laser scanner, CCD reader, and omni-directional barcode scanner can be used on a mobile device 100 to read barcode images. The type of barcode reader used on the mobile device 100 and the type of barcode being read or scanned would be selected as to be suitable to one another.

The mobile device 100 also has memory for holding stored barcode data 61, a barcode decoder module 218, and a barcode data sequencer module 220. As will be discussed further below, the mobile device 100 is able to store barcode data, decode barcodes, and sequence the barcode data.

The display 210 may display one or more barcodes in various arrangements (e.g. one at a time, multiple at a time, etc.). The display 210 may also display the barcodes at various settings (e.g. size, resolution, contrast, time between showing consecutive barcodes, etc.). These different settings and arrangements are stored in a memory part of, or in communication with, the display 210. In particular, there may be a display modes database 222 that stores the various display settings and arrangements. There is also a barcode database 224 storing the barcode data to be displayed. A set or series of barcodes includes a number of barcodes having portions of a data set. The combined portions of decoded data from each of the barcodes in the series can be used to generate the complete data set.

Each barcode in a barcode series may include a sequence indicator that can be used to recombine the accumulated barcode data into the correct sequence. The encoded barcode data may also include the total number of barcodes in the barcode series. Although not shown on the display 210, the sequence indicator and the total number of barcodes in the barcode series may also be shown on the display 210 for the benefit of the user. For example, the display 210 may show "barcode 2 of 10" when showing a barcode, and may show "barcode 3 of 10" when showing another barcode.

It can be appreciated that the barcode display 210 may also show other information, such as advertisements, a movie, television programs, etc.

Figure 19:
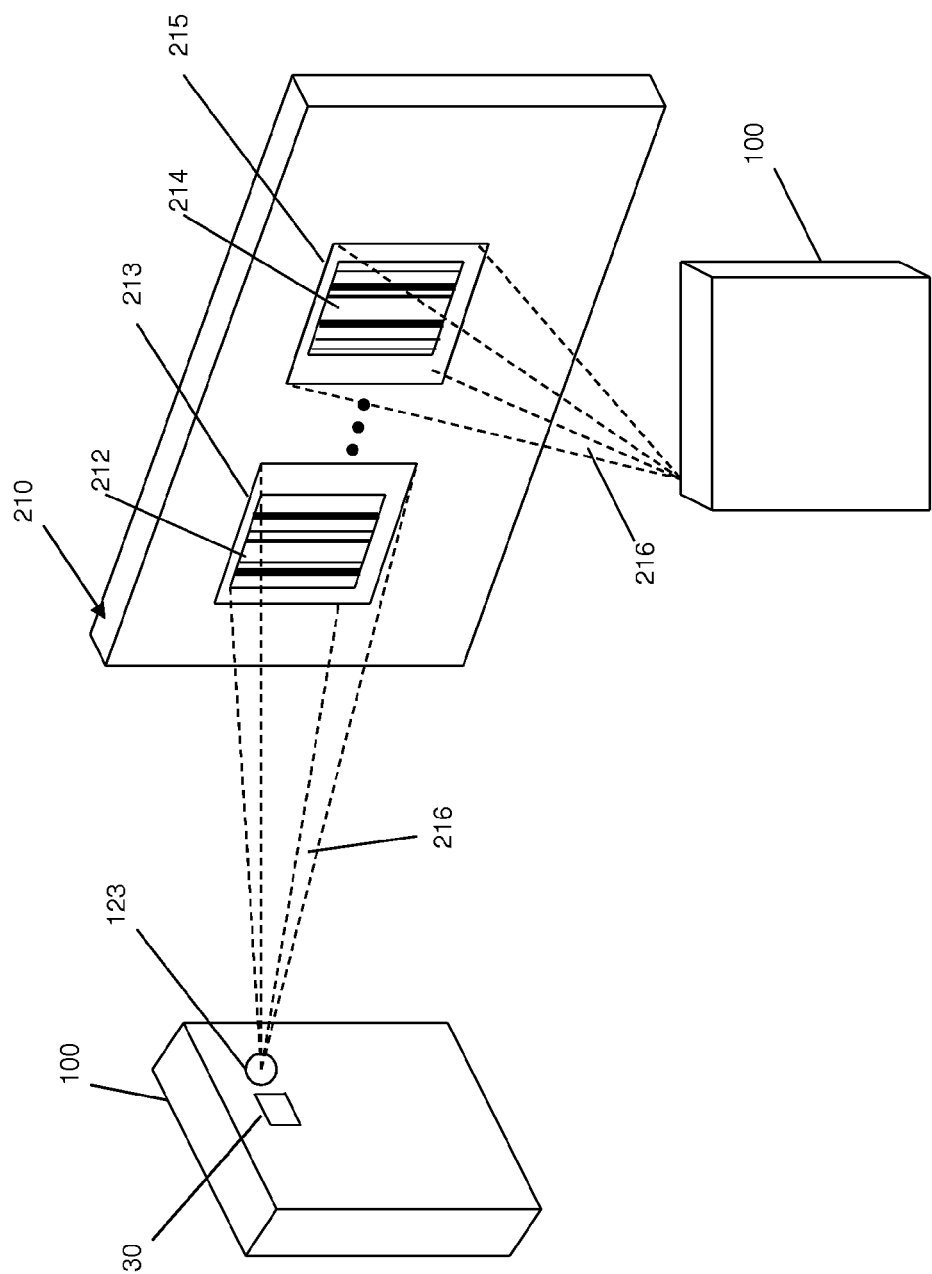
FIG. 19 is a schematic diagram of multiple mobile devices simultaneously scanning barcodes, whereby the barcodes are simultaneously displayed on a display screen.

Turning to FIG. 19, it can be appreciated that multiple mobile devices 100 may be directed to face a display 210 to capture images of barcodes. The display 201 may have multiple animated barcode areas 213 and 215, each showing a barcode 212 214, respectively. One mobile device 100 can be pointed to capture barcodes from the animated barcode area 212, while another mobile device 100 can be pointed to captured barcodes from the other animated barcode area 215. The display of multiple animated barcode areas 213, 215 allows more mobile devices 100 to view data from the display 210 simultaneously.

It can be appreciated that many barcodes are applicable to the principles described herein. As described earlier, one-dimensional barcodes and two-dimensional barcodes can be used. Non-limiting examples of applicable barcodes include: U.P.C., Codabar, Code 26, Code 39, Code 93, Code 128, Code 11, CPC Binday, DUN 14, EAN 2, EAN 5, EAN 8, EAN 14, Facing Identification Mark, GS1-128, GS1 Databar, ITF-14, Latent image barcode, Plessey, PLANET, MSI, JAN, Telepen, 3-DI, ArrayTag, Aztec Code, Small Aztec Code, Chromatic Alphabet, Chromocode, Codablock, Code 1, Code 16K, Code 49, ColorCode, Compact Matrix Code, CP Code, Cyber Code, d-tough, DataGlyphs, Datamatrix, Datastrop Code, Dot Code A, EZcode, Grid Matrix Code, High Capacity Color Barcode, HueCode, INTACTA.CODE, InterCode, MaxiCode, mCode, MiniCode, MMCC, Nintendo e-reader Dot code, Optar, PaperDisk, PDMark, QR Code, Quick Mark Code, Smart Code, Snowflake Code, Shot Code, SPARQ-Code, SuperCode, Trillcode, UltraCode, UnisCode, Veri-Code, VSCode, Water Code, etc. It can be appreciated that any visually encoded image is applicable to the principles described herein.

It can also be appreciated that various mobile devices can be used. Examples of applicable electronic devices include pagers, cellular phones, cellular smart-phones, wireless organizers, personal digital assistants, computers, laptops, hand-held wireless communication devices, wirelessly enabled notebook computers, camera devices and the like. Such devices will hereinafter be commonly referred to as "mobile devices" for the sake of clarity. It will however be appreciated that the principles described herein are also suitable to other devices, e.g. "non-mobile" devices.

In an example embodiment, the mobile device is a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities).

Figure 2:
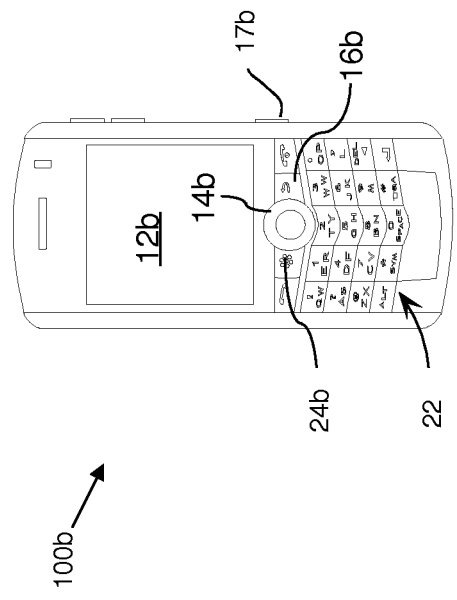
FIG. 2 is a plan view of an example mobile device.
Figure 3:
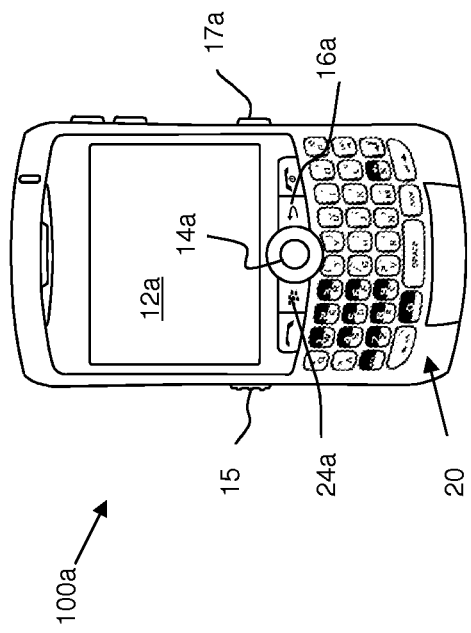
FIG. 3 is a plan view of another example mobile device.

Referring to FIGS. 2 and 3, one example embodiment of a mobile device 100a is shown in FIG. 2, and another example embodiment of a mobile device 100b is shown in FIG. 3. It will be appreciated that the numeral "100" will hereinafter refer to any mobile device 100, including the example embodiments 100a and 100b, those example embodiments enumerated above or otherwise. It will also be appreciated that a similar numbering convention may be used for other general features common between all Figures such as a display 12, a positioning device 14, a cancel or escape button 16, a camera button 17, and a menu or option button 24.

The mobile device 100a shown in FIG. 2 comprises a display 12a and the cursor or view positioning device 14 shown in this example embodiment is a trackball 14a. Positioning device 14 may serve as another input member and is both rotational to provide selection inputs to the main processor 102 (see FIG. 3) and can also be pressed in a direction generally toward housing to provide another selection input to the processor 102. Trackball 14a permits multi-directional positioning of the selection cursor 18 (see FIG. 5) such that the selection cursor 18 can be moved in an upward direction, in a downward direction and, if desired and/or permitted, in any diagonal direction. The trackball 14a is in this example situated on the front face of a housing for mobile device 100a as shown in FIG. 2 to enable a user to manoeuvre the trackball 14a while holding the mobile device 100a in one hand. The trackball 14a may serve as another input member (in addition to a directional or positioning member) to provide selection inputs to the processor 102 and can preferably be pressed in a direction towards the housing of the mobile device 100b to provide such a selection input.

The display 12 may include a selection cursor 18 that depicts generally where the next input or selection will be received. The selection cursor 18 may comprise a box, alteration of an icon or any combination of features that enable the user to identify the currently chosen icon or item. The mobile device 100a in FIG. 2 also comprises a programmable convenience button 15 to activate a selected application such as, for example, a calendar or calculator. Further, mobile device 100a includes an escape or cancel button 16a, a camera button 17a, a menu or option button 24a and a keyboard 20. The camera button 17 is able to activate photo-capturing functions when pressed preferably in the direction towards the housing. The menu or option button 24 loads a menu or list of options on display 12a when pressed. In this example, the escape or cancel button 16a, the menu option button 24a, and keyboard 20 are disposed on the front face of the mobile device housing, while the convenience button 15 and camera button 17a are disposed at the side of the housing. This button placement enables a user to operate these buttons while holding the mobile device 100 in one hand. The keyboard 20 is, in this example embodiment, a standard QWERTY keyboard.

The mobile device 100b shown in FIG. 3 comprises a display 12b and the positioning device 14 in this example embodiment is a trackball 14b. The mobile device 100b also comprises a menu or option button 24b, a cancel or escape button 16b, and a camera button 17b. The mobile device 100b as illustrated in FIG. 2, comprises a reduced QWERTY keyboard 22. In this example embodiment, the keyboard 22, positioning device 14b, escape button 16b and menu button 24b are disposed on a front face of a mobile device housing. The reduced QWERTY keyboard 22 comprises a plurality of multi-functional keys and corresponding indicia including keys associated with alphabetic characters corresponding to a QWERTY array of letters A to Z and an overlaid numeric phone key arrangement.

It will be appreciated that for the mobile device 100, a wide range of one or more positioning or cursor/view positioning mechanisms such as a touch pad, a positioning wheel, a joystick button, a mouse, a touchscreen, a set of arrow keys, a tablet, an accelerometer (for sensing orientation and/or movements of the mobile device 100 etc.), or other whether presently known or unknown may be employed. Similarly, any variation of keyboard 20, 22 may be used. It will also be appreciated that the mobile devices 100 shown in FIGS. 2 and 3 are for illustrative purposes only and various other mobile devices 100 are equally applicable to the following examples. For example, other mobile devices 100 may include the trackball 14b, escape button 16b and menu or option button 24 similar to that shown in FIG. 3 only with a full or standard keyboard of any type. Other buttons may also be disposed on the mobile device housing such as colour coded "Answer" and "Ignore" buttons to be used in telephonic communications. In another example, the display 12 may itself be touch sensitive thus itself providing an input mechanism in addition to display capabilities.

To aid the reader in understanding the structure of the mobile device 100, reference will now be made to FIGS. 4 through 6.

Figure 4:
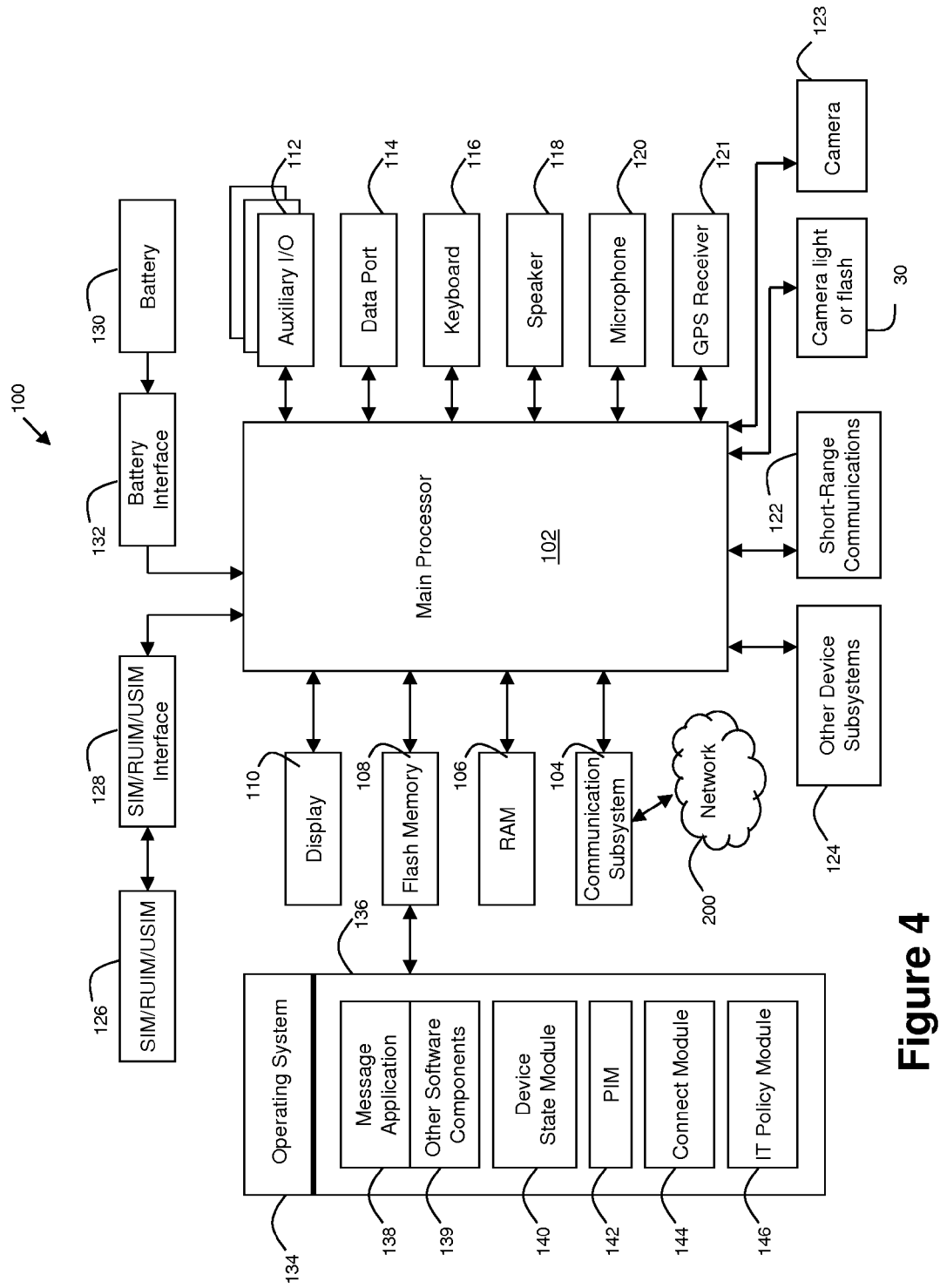
FIG. 4 is a block diagram of an example embodiment of a mobile device.

Referring first to FIG. 4, shown therein is a block diagram of an example embodiment of a mobile device 100. The mobile device 100 comprises a number of components such as a main processor 102 that controls the overall operation of the mobile device 100. Communication functions, including data and voice communications, are performed through a communication subsystem 104. The communication subsystem 104 receives messages from and sends messages to a wireless network 200. In this example embodiment of the mobile device 100, the communication subsystem 104 is configured in accordance with the Global System for Mobile Communication (GSM) and General Packet Radio Services (GPRS) standards, which is used worldwide. Other communication configurations that are equally applicable are the 3G and 4G networks such as EDGE, UMTS and HSDPA, LTE, Wi-Max etc. New standards are still being defined, but it is believed that they will have similarities to the network behaviour described herein, and it will also be understood by persons skilled in the art that the example embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, a GPS receiver 121, short-range communications 122, a camera 123, a camera light or flash 30, and other device subsystems 124.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list.

The mobile device 100 can send and receive communication signals over the wireless network 200 after required network registration or activation procedures have been completed. Network access is associated with a subscriber or user of the mobile device 100. To identify a subscriber, the mobile device 100 may use a subscriber module component or "smart card" 126, such as a Subscriber Identity Module (SIM), a Removable User Identity Module (RUIM) and a Universal Subscriber Identity Module (USIM). In the example shown, a SIM/RUIM/USIM 126 is to be inserted into a SIM/RUIM/USIM interface 128 in order to communicate with a network. Without the component 126, the mobile device 100 is not fully operational for communication with the wireless network 200. Once the SIM/RUIM/USIM 126 is inserted into the SIM/RUIM/USIM interface 128, it is coupled to the main processor 102.

The mobile device 100 is a battery-powered device and includes a battery interface 132 for receiving one or more rechargeable batteries 130. In at least some example embodiments, the battery 130 can be a smart battery with an embedded microprocessor. The battery interface 132 is coupled to a regulator (not shown), which assists the battery 130 in providing power V+ to the mobile device 100. Although current technology makes use of a battery, future technologies such as micro fuel cells may provide the power to the mobile device 100.

The mobile device 100 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, may be installed on the mobile device 100 during its manufacture. Software applications may include a message application 138, a device state module 140, a Personal Information Manager (PIM) 142, a connect module 144 and an IT policy module 146. A message application 138 can be any suitable software program that allows a user of the mobile device 100 to send and receive electronic messages, wherein messages are typically stored in the flash memory 108 of the mobile device 100. A device state module 140 provides persistence, i.e. the device state module 140 ensures that important device data is stored in persistent memory, such as the flash memory 108, so that the data is not lost when the mobile device 100 is turned off or loses power. A PIM 142 includes functionality for organizing and managing data items of interest to the user, such as, but not limited to, e-mail, contacts, calendar events, and voice mails, and may interact with the wireless network 200. A connect module 144 implements the communication protocols that are required for the mobile device 100 to communicate with the wireless infrastructure and any host system, such as an enterprise system, that the mobile device 100 is authorized to interface with. An IT policy module 146 receives IT policy data that encodes the IT policy, and may be responsible for organizing and securing rules such as the "Set Maximum Password Attempts" IT policy.

Other types of software applications or components 139 can also be installed on the mobile device 100. These software applications 139 can be pre-installed applications (i.e. other than message application 138) or third party applications, which are added after the manufacture of the mobile device 100. Examples of third party applications include games, calculators, utilities, etc.

The additional applications 139 can be loaded onto the mobile device 100 through at least one of the wireless network 200, the auxiliary I/O subsystem 112, the data port 114, the short-range communications subsystem 122, or any other suitable device subsystem 124.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the battery 130 of the mobile device 100.

For voice communications, received signals are output to the speaker 118, and signals for transmission are generated by the microphone 120. Although voice or audio signal output is accomplished primarily through the speaker 118, the display 110 can also be used to provide additional information such as the identity of a calling party, duration of a voice call, or other voice call related information.

Figure 5:
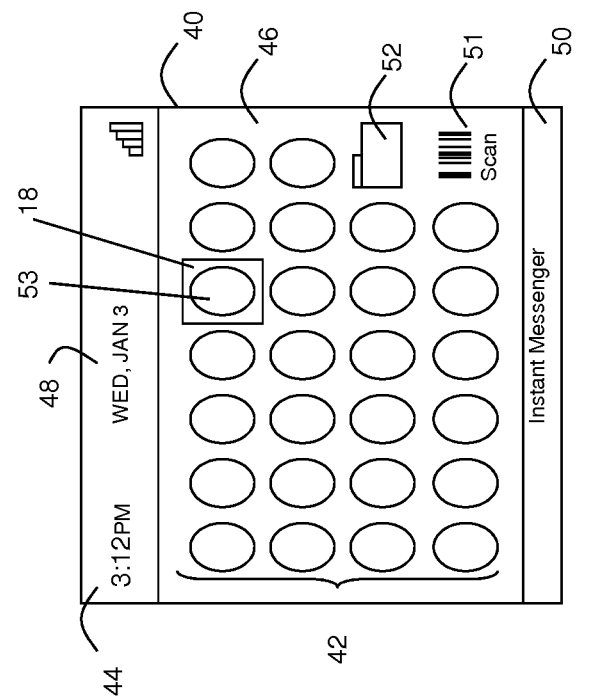
FIG. 5 is a screen shot of a home screen displayed by the mobile device.

Turning now to FIG. 5, the mobile device 100 may display a home screen 40, which can be set as the active screen when the mobile device 100 is powered up and may constitute the main ribbon application. The home screen 40 generally comprises a status region 44 and a theme background 46, which provides a graphical background for the display 12. The theme background 46 displays a series of icons 42 in a predefined arrangement on a graphical background. In some themes, the home screen 40 may limit the number icons 42 shown on the home screen 40 so as to not detract from the theme background 46, particularly where the background 46 is chosen for aesthetic reasons. The theme background 46 shown in FIG. 5 provides a grid of icons. It will be appreciated that preferably several themes are available for the user to select and that any applicable arrangement may be used. An example icon may be a barcode scan icon 51 used to indicate the barcode application. One or more of the series of icons 42 is typically a folder 52 that itself is capable of organizing any number of applications therewithin.

The status region 44 in this example embodiment comprises a date/time display 48. The theme background 46, in addition to a graphical background and the series of icons 42, also comprises a status bar 50. The status bar 50 provides information to the user based on the location of the selection cursor 18, e.g. by displaying a name for the icon 53 that is currently highlighted.

An application, such as message application 138 may be initiated (opened or viewed) from display 12 by highlighting a corresponding icon 53 using the positioning device 14 and providing a suitable user input to the mobile device 100. For example, message application 138 may be initiated by moving the positioning device 14 such that the icon 53 is highlighted by the selection box 18 as shown in FIG. 5, and providing a selection input, e.g. by pressing the trackball 14b.

Figure 6:
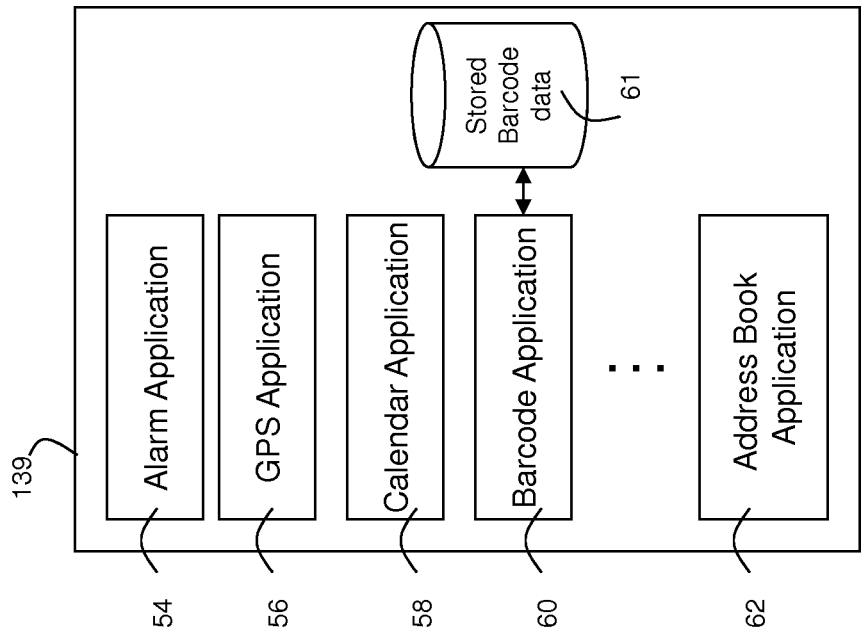
FIG. 6 is a block diagram illustrating example ones of the other software applications and components shown in FIG. 4.

FIG. 6 shows an example of the other software applications and components 139 that may be stored and used on the mobile device 100. Only examples are shown in FIG. 6 and such examples are not to be considered exhaustive. In this example, an alarm application 54 may be used to activate an alarm at a time and date determined by the user. A GPS application 56 may be used to determine the location of a mobile device. A calendar application 58 that may be used to organize appointments. Another example application is a barcode application 60 that may be used to capture an image of a barcode or scan a barcode, decode the barcode, and sequence barcode data. The captured barcode data and sequenced barcode data can be stored in a barcode database 61. Another application shown is an address book 62 that is used to store contact information which may include, for example, a phone number, name and e-mail address.

It will be appreciated that any module or component exemplified herein that executes instructions or operations may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data, except transitory propagating signals per se. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 100 or the display 210, or accessible or connectable thereto. Any application or module herein described may be implemented using computer readable/executable instructions or operations that may be stored or otherwise held by such computer readable media.

Figure 7:
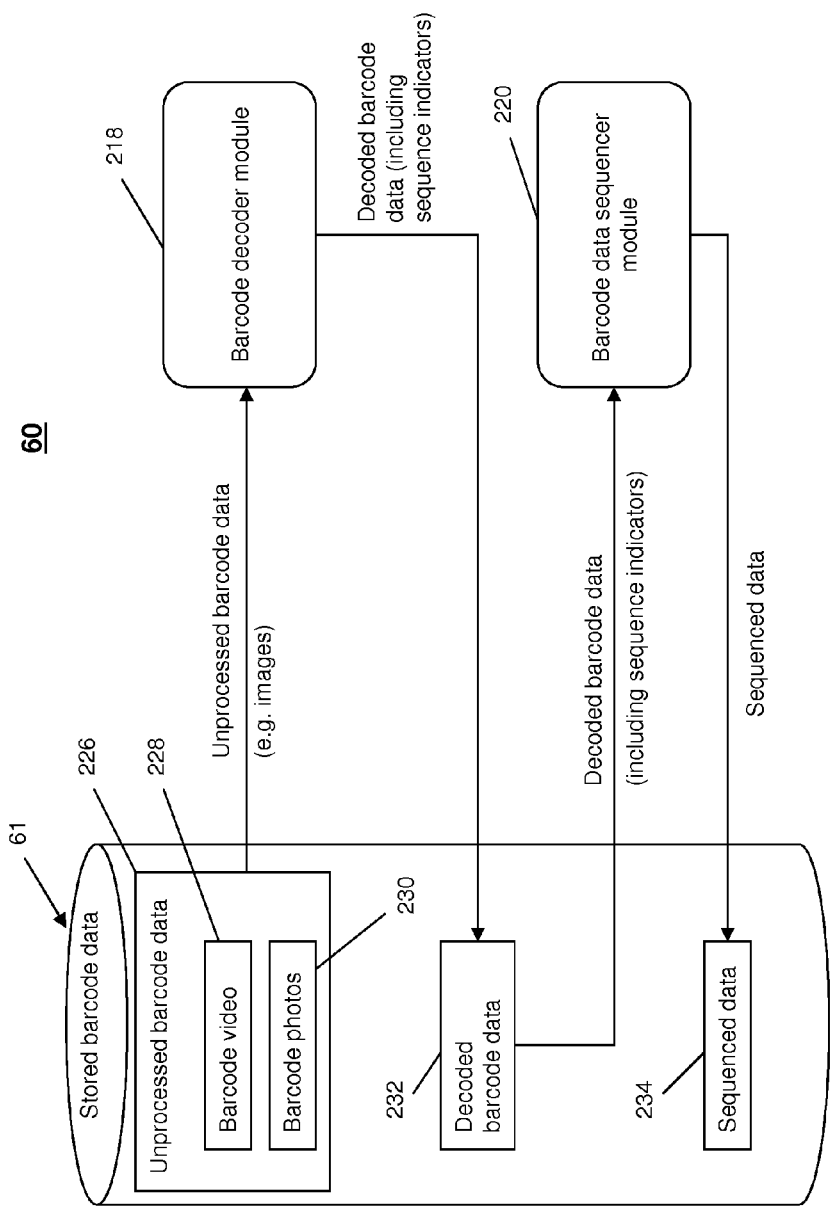
FIG. 7 is a block diagram illustrating example components of stored barcode data and of a barcode application.

Referring to FIG. 7, an example configuration of the barcode application 60 is provided. The barcode database 61 on or accessed by the mobile device 100 includes unprocessed barcode data 226, decoded barcode data 232, and sequenced data 234. The unprocessed barcode data 226 can include barcode video 228 and barcode photos 230. For example, a user may use the camera 123 to record a video of a series of barcodes being cycled on a display 210. The user may also use the mobile device 100 to take or capture still photos of the barcodes being cycled on a display. This unprocessed barcode data 226 is then decoded by the barcode decoder module 218. In other words, the encoded data from the barcode is extracted. The methods for extracting or decoding the barcode data is known in the art and varies depending on the type of barcode as well as the type of barcode reader. These known methods and systems for decoding barcodes can be used with principles described herein. The barcode decoder module 218 is also able to decode or extract a sequence indicator associated with each barcode and, optionally, the total number of barcodes in the given barcode series or barcode set. The decoded barcode data 232, including the sequence indicators and the total number of barcodes, is stored in the barcode database 61.

The portions of decoded barcode data 232, including the sequence indicators that correspond to a given barcode series, are then combined by the barcode data sequencer module 220. The decoded data may be combined in various way, not necessarily in sequential order. The sequence indicators are used to arrange the portions of the decoded barcode data 232 into a combined or complete form. The combined or sequenced data 234 that is generated by the sequencer module 220 is then stored in the barcode database 61.

Figure 8:
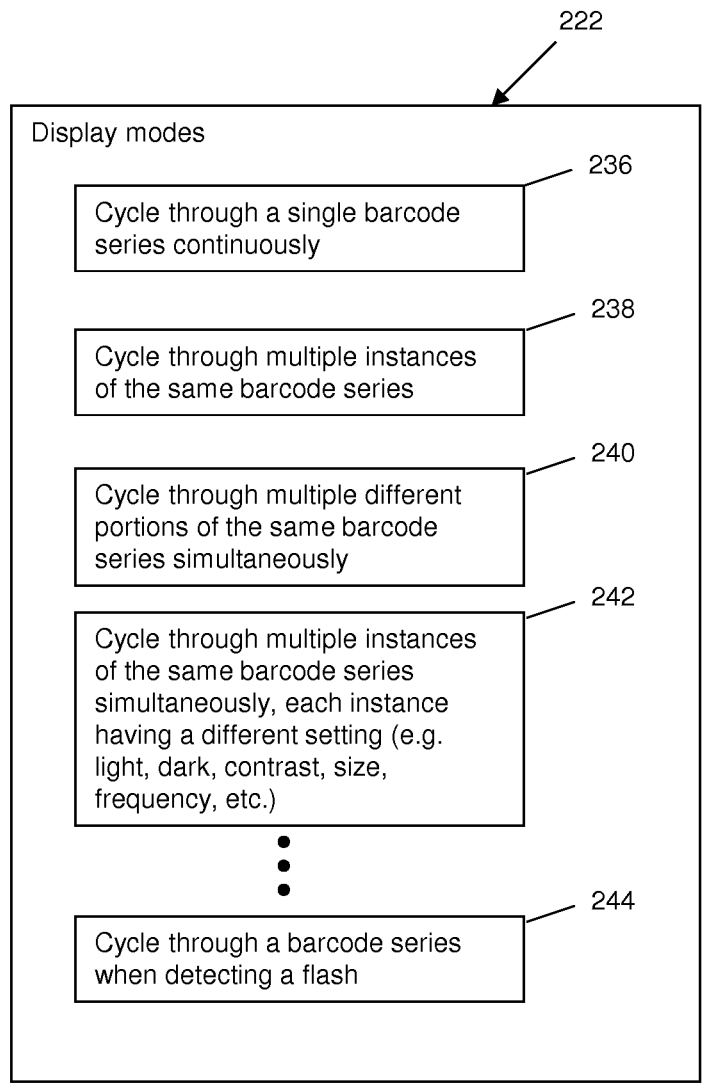
FIG. 8 is a block diagram illustrating example components of display modes showing one or more barcodes.

Turning to FIG. 8, different display modes (e.g. 236, 238, 240, 242, 244) in the display modes database 222 are shown. As described earlier, a display 210 can show one or more barcodes at a time and can show them in various arrangements and settings. One display mode 236 cycles through a single barcode series continuously. In other words, a single barcode in a barcode series is shown first, and then at a different time, another single barcode in the same series is shown. This mode 236 is shown best in FIG. 9, where at a first time t1 the display 210 shows a barcode 246. Then, at a later time t2, the display 210 shows another barcode 248.

Another display mode 238 cycles through multiple instances of the same barcode series. In this mode 238, as shown in FIG. 10, the display 210 has multiple barcode animated barcode areas 250, 252, 254 each showing the same barcode. At a first time t1, one barcode in a barcode series is shown in each of the animated barcode areas 250, 252, 254. At a later time t2, another barcode in the barcode series is shown in each of the animated barcode areas 256, 258, 260. It can be appreciated that barcode areas 250, 252, 254 and 256, 258, 260 can be the same barcode areas, respectively, but at different times. This display mode 238 allows multiple mobile devices 100 to more easily view and capture the barcode images. For example, multiple users may stand beside one another, each pointing their mobile device 100 at an animated barcode area on the display 210. As the barcodes in each animated barcode area cycle through the barcode series, each mobile device 100 can receive the encoded barcode data. It can be appreciated that an animated barcode area displaying 2D barcodes is considered a 3D barcode, since it augments the 2D barcodes with a time axis. In other words, encoded data displayed on the animated barcode area varies along the x axis, y axis and the time axis.

Display mode 240 cycles through multiple different portions of the same barcode series simultaneously. This is similar to display mode 238, however, each animation barcode area displays a different barcode at each time. In one example embodiment, certain animation barcode areas display barcodes of a certain barcode series, while other animation barcode areas display barcodes belonging to another barcode series.

Turning to FIG. 11, an example embodiment of the display mode 242 is shown. The display 210 has multiple animation barcode areas showing different barcodes (e.g. data portions) belonging to the same barcode series. The barcode series in this example comprise barcodes A, B, C, D . . . N, N+1. At a first time t1, the display 210 has number of animation barcode areas 262, 264, 268, 270 showing barcodes A, B, C . . . N, respectively. At a later time t2, the same animation barcode areas 272, 274, 276 show the barcodes B, C, D . . . N+1, respectively. It can thus be seen from the example of FIG. 11 that each animation barcode area may show barcodes of the same barcode series, but the barcodes between the animation barcode areas are displayed out of synchronization. This allows a user to more quickly start viewing the barcode through the mobile device 100, when the desired barcode in the barcode series is shown.

For example, a user may have captured the first ten barcodes out of a barcode series having a total of twenty barcodes. At a later time or at a different display 210, the user may wish to capture the remaining ten barcodes in the barcode series. However, as the barcodes are cycled one after another, the user may not wish to wait for the first ten barcodes to be shown, since these have already been captured. Therefore, if the display 210 in display mode 240, the user can simply locate the animated barcode area (out of the multiple animated bar code areas) that is about to start showing the remaining ten barcodes, and point the mobile device's camera 123 at that animated barcode area. This will reduce the amount of time for the user to collect the remaining barcode data.

Display mode 242 is similar to display mode 238, in that there are multiple instances of the same barcode shown simultaneously. However, in display mode 238, each instance of the barcode shown in the animated barcode areas have a different display setting. For example, turning to FIG. 12, at a first time t1, the display 210 shows the animation barcode area 280, which shows a brighter version of barcode A, and the animation barcode area 282, which shows a darker version of the same barcode A. At a later time t2, the display 210 show the animated barcode areas 284 and 286 in the same areas as the previous animated barcode areas of t1, although the barcodes B are shown. At time t2, the barcode B in animated barcode area 284, corresponding to animated barcode area 280, is shown in a lighter version or setting. The barcode B in animated barcode area 286, corresponding to animated barcode area 282, is shown in a darker version or setting. Other example settings that can be changed between animation barcode areas are contrast, size, resolution, brightness or darkness, and frequency. The rate or frequency that the barcodes are cycled can be changed. It can be appreciated that displaying different settings simultaneously allows different mobile devices 100, having different capabilities, to more easily capture the barcode data based on the most appropriate setting. For example, a camera 123 on a mobile device 100 may have poor contrast detection abilities. Therefore, a higher contrast image of a barcode is more suitable. In another example, a mobile device 100 may have faster processing performance, and therefore is able to capture the barcodes on a display 210 showing a fast animation of barcodes (e.g. high frequency setting). In another example, a mobile device 100 may be located further away from the display screen 100 and therefore a larger sized barcode setting is more suitable or more readily captured for the camera 123. It can therefore be appreciated that displaying different barcodes at different settings can accommodate different types of mobile devices 100.

It can be appreciated that the different settings may also be combined. For example, as shown in FIG. 13, there are four animation barcode areas 288, 290, 292 and 294 on a display 210. The four animation barcode areas may each display the barcodes at different contrast settings, for example. In addition, each animation barcode area may have a different cycling frequency. Animation barcode area 288 cycles to another barcode every 0.5 seconds; animation barcode area 290 cycles to another barcode every 1 second; animation barcode area 292 cycles to another barcode every 10 seconds; and, animation barcode area 294 cycles to another barcode every 5 seconds. In this way, two different settings (e.g. contrast and frequency) are combined.

It can also be appreciated the features of display mode 242 (e.g. different settings) and the features of display mode 240 (e.g. staggered cycling of barcode series) can be combined.

The order or sequence in which the barcodes in the barcode series may also be varied. For example, the barcode do not need to be displayed in order from the first barcode to the last barcode. They can be displayed in a random order or displayed in a different or mixed order.

Although not shown, the display 210 may also display at least two animated barcode areas, whereby a first animated barcode area shows a first set of barcodes in a barcode series and a second animated barcode area shows a second set of barcodes in the same barcode series. Where the barcodes in the barcode sequence have consecutively numbered sequence identifications (e.g. 1, 2, 3, 4, . . . ), the first set of barcodes include only odd barcodes (e.g. sequence identifications 1, 3, 5, . . . ), and the second set of barcodes include only even barcodes (e.g. sequence identifications 2, 4, 6, . . . ). Alternatively, the first set of barcodes may include the first half of the barcodes series (e.g. having sequence identifications 1, 2, 3, 4), and the second set of barcodes may include the second half of the barcode series (e.g. having sequence identifications 5, 6, 7, 8). Other ways of dividing a barcode series into two or more sets of barcodes can also be used. Showing multiple animated barcode areas simultaneously on a display helps multiple users each simultaneously scan a respective animated barcode area, as shown for example in FIG. 19. Further, by dividing a barcode series across two or more sets of barcodes, each set being displayed on a different animated barcode area, a user can scan one set of barcodes at one animated barcode area, and then move to another animated barcode area to scan another ser of barcodes. This may be desirable when, for example, an advertiser wishes to place one set of barcodes at one location, and another set of barcodes at another location on the display 210.

The display modes 236, 238, 240, 242 are able to transfer data to a mobile device 100 without any feedback from the mobile device 100. By simply cycling or rotating through a series of barcodes, the mobile device 100 as described herein is able to capture the data shown in each barcode. In other words, there is no feedback between the mobile device 100 and the display 210. Alternatively, the relationship between the display 210 and the mobile device 100 can referred to as an open-loop relationship. This simplifies and reduces the operations of the display device 210, as well as the components. For example, commonly used television screens, LCD monitors, light projections on a surface, etc. can be used as a display 210 to show a number of animated barcodes. A non-electronic display, such as a paper roll that has rotating panels, each containing a different barcode, can also be used to display barcodes one after the other. A mobile device 100 is able to capture or read the barcode images from these example displays 210 to collect and compile a completed data set, since sufficient information is provided in the barcodes themselves. Further, as described above, the various display modes increase the effectiveness and efficiency of transferring the barcode data from the display 210 to one or more mobile devices 100.

Turning back to FIG. 8, display mode 244 cycles through each barcode in a barcode series when detecting a flash, e.g. of a camera 123. Further detail of this display mode will be explained further below.

Figure 14:
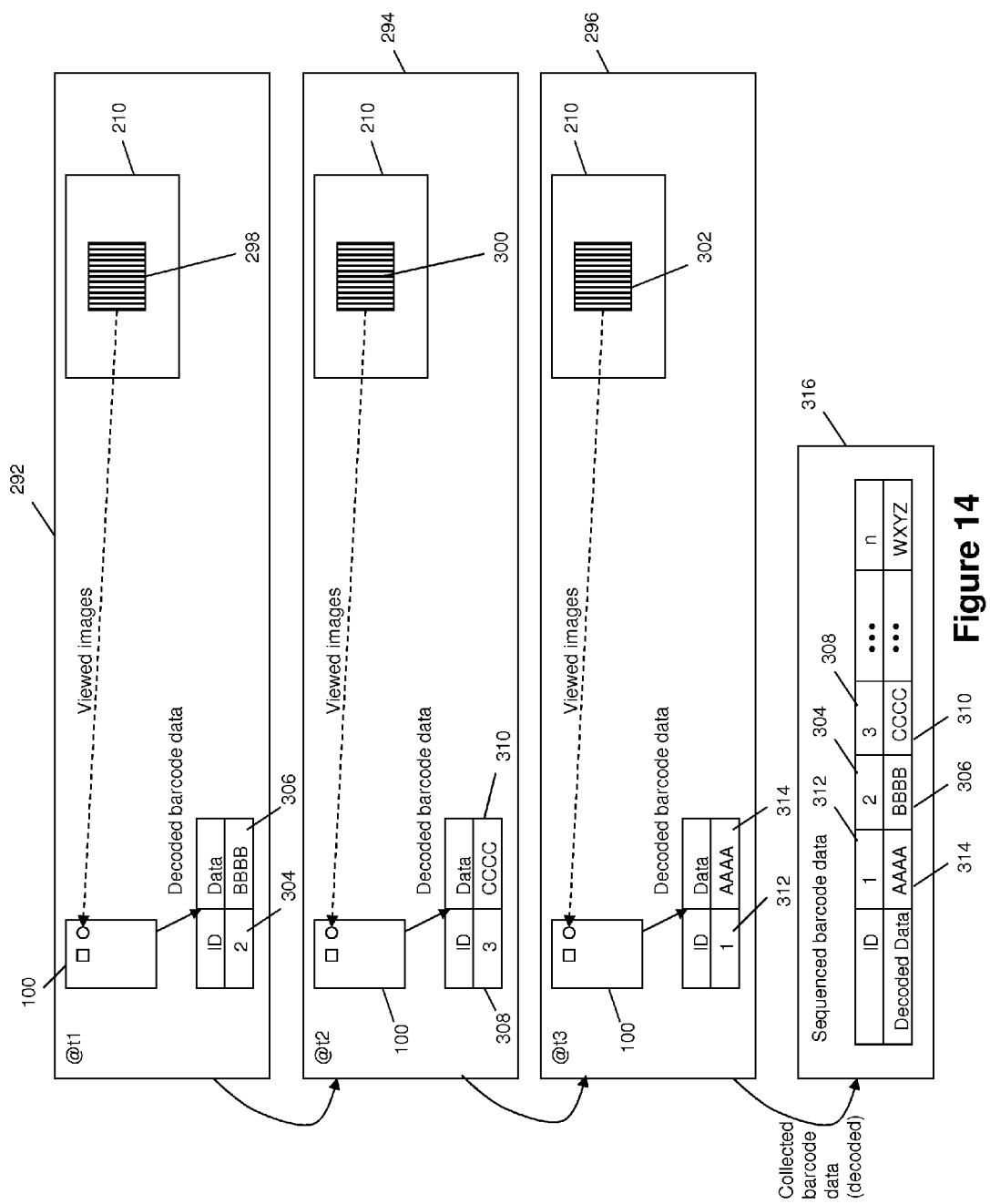
FIG. 14 is an example schematic diagram of a mobile device capturing barcode images, decoding the barcode data, and generating a sequenced combination of barcode data.

FIG. 14 shows the different stages or operations of a mobile device 100 capturing a number of barcodes that are shown one after the other on a display 210, and then generating the complete barcode data. As discussed earlier, a data set is separated into smaller portions of data. Associated with each portion of data is a sequence identification that can be used to arrange and combine the portions of data to regenerate the complete data set. At least each portion of data and the associated sequence identification are encoded into a barcode. Each barcode may also include the total number of data portions used to represent the data set.

Given the above, at block 292, at a first time t1, the display 210 shows a barcode 298. The mobile device 100 captures the image of the barcode 298 and decodes the image, for example using the barcode decoder module 218. From the barcode 298, the decoded sequence identification and the data are extracted. In this case, the sequence identification is 2 (304) and the data is BBBB (306). At block 294, at a later time t2, the display 210 shows a different barcode 300. The mobile device 100 captures the image of the barcode 300 and decodes it to extract the sequence identification 3 (308) and the data CCCC (310). Similarly, at block 296, at a subsequent time t3, the display 210 shows yet another barcode 302, an image of which is captured by the mobile device 100. The information from the barcode 302 is extracted as sequence identification 1 (312) and data AAAA (314).

Once the barcode data has been collected, the mobile device 100 combines the decoded data together. The resulting combination of data is shown in block 316. In this case, the mobile device 100 concatenates the data 314, 306, 310 based on the order of the associated sequential identifications, e.g. 1 (312), 2 (304) and 3 (308). In other words, the complete decoded data is AAAABBBBCCCC . . . etc.

It can be appreciated that the operations in FIG. 14 are examples. The order of the operations may vary. Further, there may be other ways of combining the decoded data.

Figure 15:
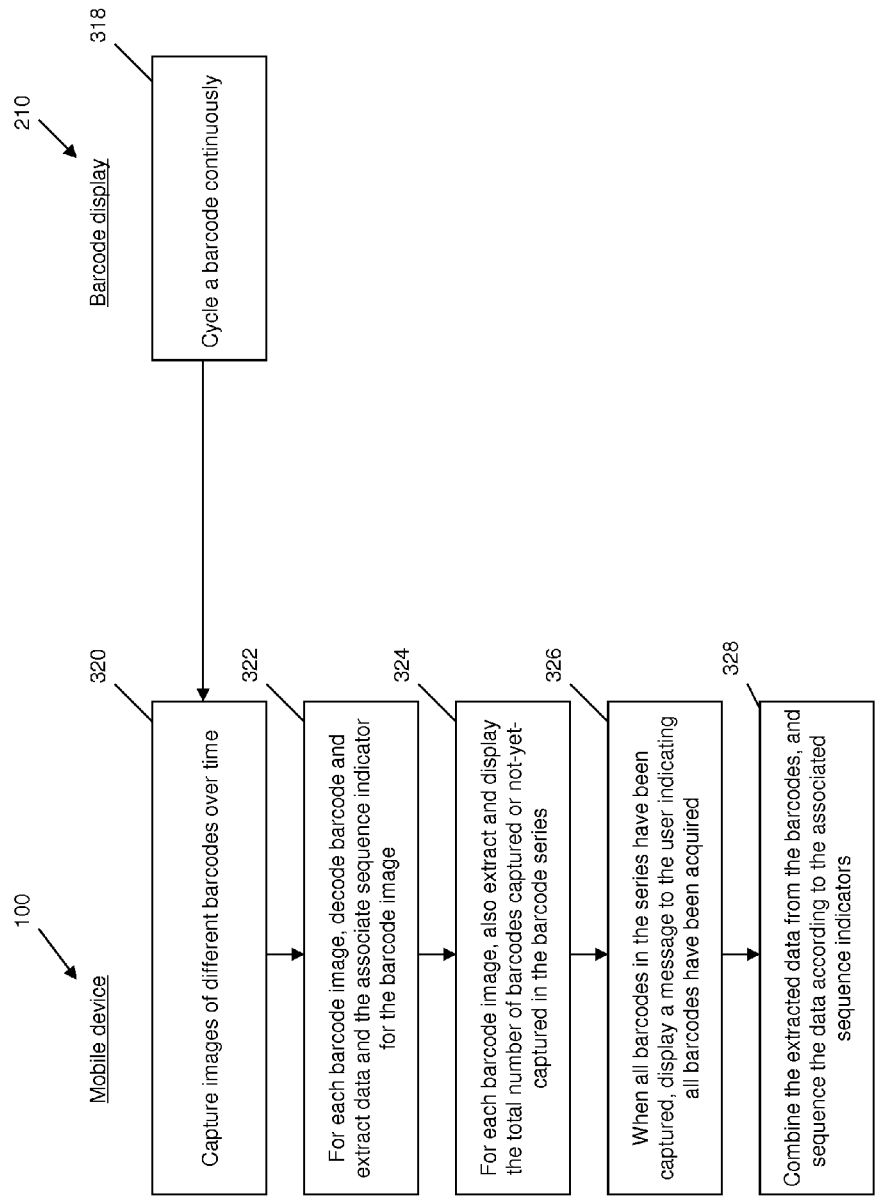
FIG. 15 is a flow diagram of example computer executable instructions for receiving barcode data and combining the decoded barcode data.

Turning to FIG. 15, example computer executable instructions are provided for a barcode display 210 and a mobile device 100 for transferring data to the mobile device 100 through an animation of barcodes. At block 318, the display 210 displays one or more barcodes, cycling continuously through at least two barcodes in a barcode series.

At block 320, the mobile device 100 captures images of the different barcodes over time, e.g. through still photos or through video. At block 322, for each barcode image, the mobile device 100 decodes the barcode and extracts the data and the associated sequence indicator. Optionally, if the barcode image also includes the total number of barcodes in the barcode series, then at block 324, the mobile device 100 also extracts the data indicating the total number of barcodes. Then, the total number of barcodes is displayed on the mobile device's display 12, as well as the total number of barcodes captured and not-yet captured in the barcode series. From this information, the user is able to determine how many more barcodes need to be captured to completely transfer the data of the given entire barcode series. When all barcodes in the barcode series have been captured, as identified by the mobile device 100, at block 326, the mobile device 100 displays a message to the user indicating all barcodes have been acquired. The user, for example, can use this information to stop retrieving or capturing barcode images from the display 210.

Continuing with FIG. 15, at block 328, mobile device 100 combines the extracted data from the barcodes and sequences the data according to the associated sequence indicators. In another example embodiment, it can be appreciated that all the images can be collected first, subsequently decoded, and then combined.

Figure 16:
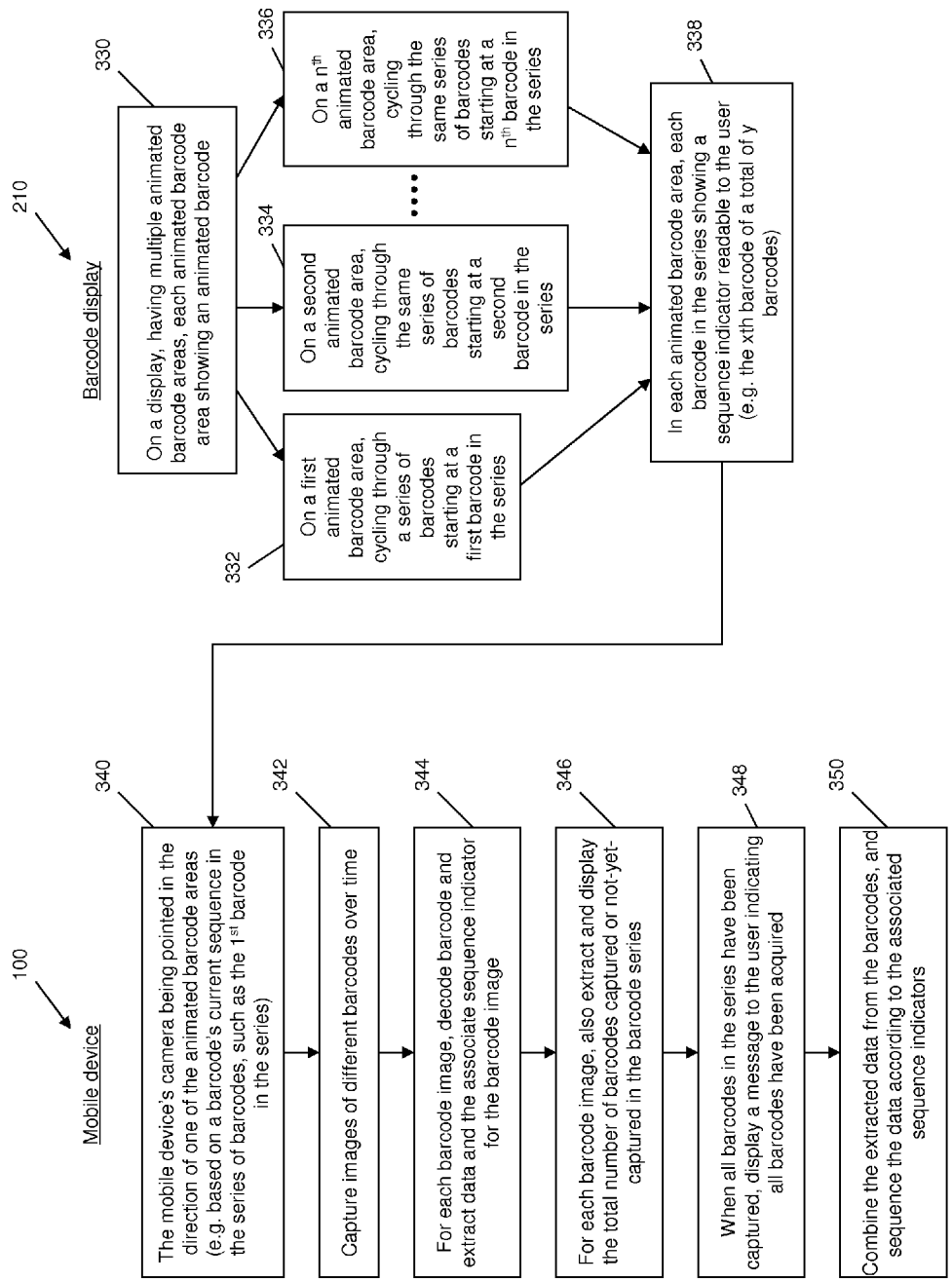
FIG. 16 is a flow diagram of example computer executable instructions for a display screen showing multiple animated barcode areas, and a mobile device receiving and sequencing the barcode data.

FIG. 16 shows example computer executable instructions for a display 210 showing multiple animated barcode areas (e.g. display modes 238, 240, 242). At block 330, the display 210 shows multiple animated barcode areas, with each animated barcode area showing or cycling through animated barcodes. At block 332, on a first animated barcode area, the display 210 cycles through a series of barcodes starting at a first barcode in a barcode series. As can be understood, the barcode series includes a number of barcodes each containing portions of data that, when combined, forms a complete data set. At block 334, on a second animated barcode area, the display 210 cycles through the same barcode series, however, starting at a second barcode in the barcode series. Similarly, at block 336, the display 210 cycles through the same barcode series, but starting at a different barcode in the series. It can be appreciated that the example described in FIG. 16 illustrates a staggered display of a barcode series, as described earlier with respect to display mode 240 and FIG. 11. Other staggered arrangements (e.g. the second animated barcode area starts showing the barcode in the middle of the series) can also be used.

At block 338, the display 210 may also show in each animated barcode area a sequence indicator that can be read by the user. The sequence indicator may show that the current barcode displayed is the $x^{th}$ barcode of a total of y barcodes.

Continuing with FIG. 16, at block 340, the mobile device 100 is positioned so that the camera 123 is directed toward at least one of the animated barcode areas on the display 210. The user may wish to point the camera 123 at an animated barcode area based on the current barcode being displayed, and the barcode's sequence in the series of barcodes. For example, if the no barcodes have yet been captured, the user would point the camera 123 at the animated barcode area showing the first barcode in the barcode series.

At block 342, the mobile device 100 captures images (e.g. photos or video, or both) of different barcodes over time. At each barcode image (block 344), the mobile device 100 decodes the barcode and extracts the data portion and the associated sequence indicator. At block 346, after decoding the barcode, the mobile device 100 may also display the total number of barcode captured or not-yet-captured in the series, or both. At block 348, when all barcodes in the series have been captures, a message is displayed to the user indicating all barcodes have been acquired. At block 350, the extracted data portions from the barcodes are combined according to the sequence indicators. For example, the data portions may be concatenated in a sequence based on the sequence indicators.

As can be seen from FIGS. 15 and 16, the display 210 and the mobile device 100 are in an open-loop relationship, since no feedback from the mobile device 100 is required by the display 210. This can increase the speed at which data is transferred to the mobile device 100, since no feedback operations are used. This can also simplify the types of displays 201 being used, since the display 210 does not need to detect feedback from the mobile device 100.

Figure 17:
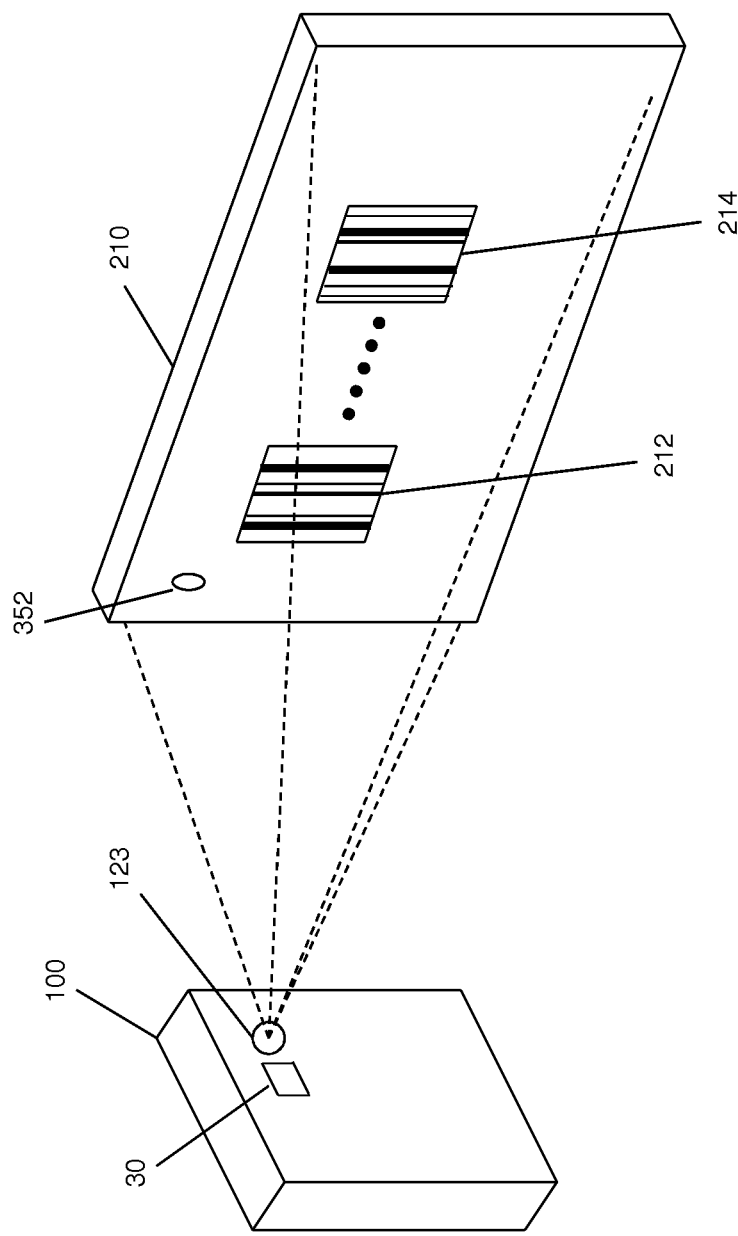
FIG. 17 is an example schematic diagram of a mobile device and a display screen having a light sensor.

Turning to FIG. 17, another example embodiment of transferring data to a mobile device 100 through animated barcodes 212, 214 is provided. This example embodiment is a closed-loop relationship, whereby the mobile device 210 provides feedback to the display 210. In particular, the display 210, which shows or displays the barcodes 212, 214, includes a light or flash sensor 352. The sensor 352 is able to detect sudden changes in light, such as a sudden increase brightness or light intensity. An example of such a sensor 352 is a photoresistor. The sensor 352 can be used to detect the mobile device's camera flash 30, whereby the camera flash acts as feedback from the mobile device 100 to the display 210.

The use of a camera flash 30 and the light sensor 352 on the display 210 can be used when the display 210 is in display mode 244. In other words, the display 210 cycles shows a subsequent barcode upon detecting a camera flash using the sensor 352.

Figure 18:
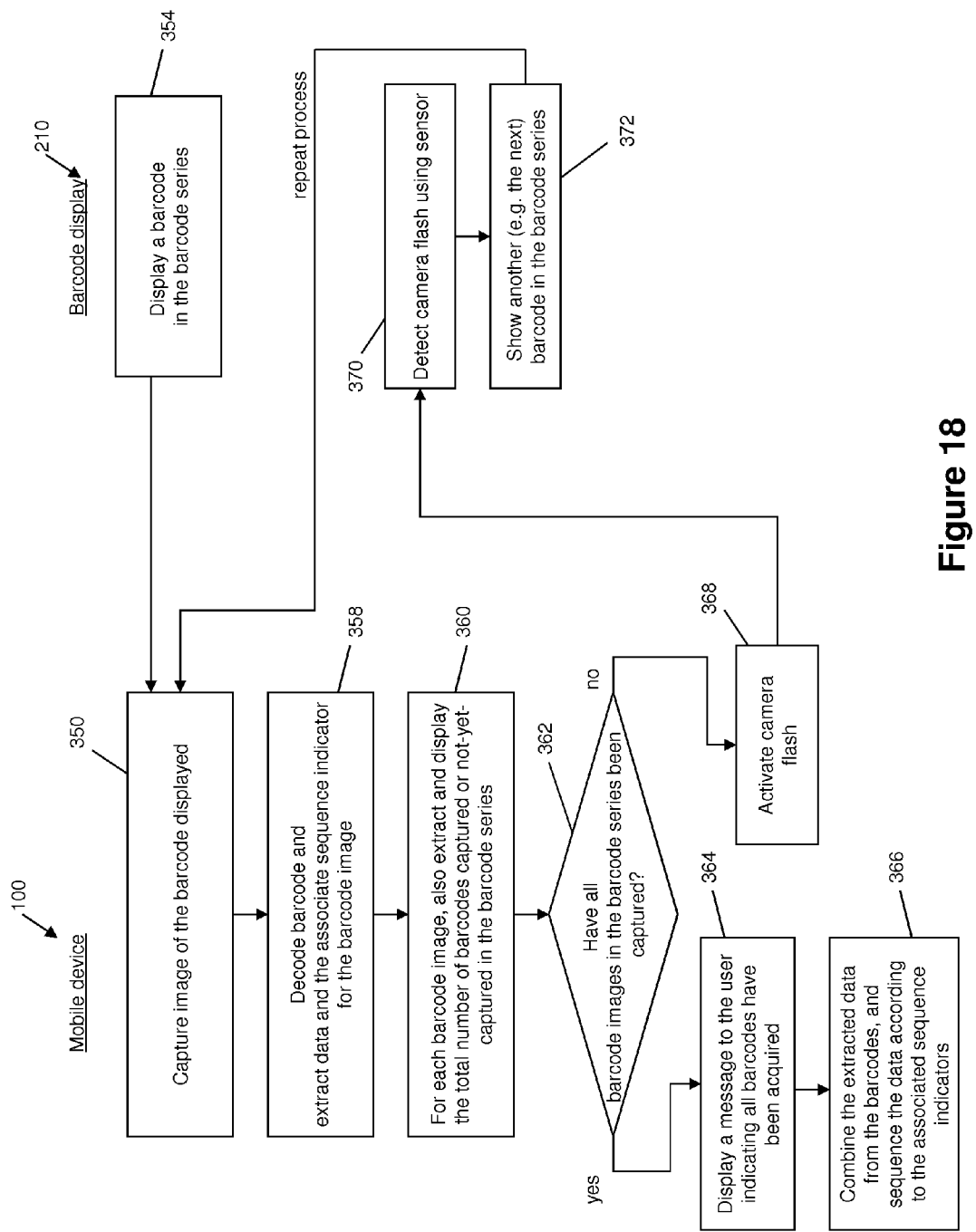
FIG. 18 is a flow diagram of example computer executable instructions for a barcode display transferring barcode data to a mobile device in a series of barcode images, triggered by a camera flash on the mobile device.

Turning to FIG. 18, computer executable instructions are provided for a display 210 and mobile device 100 interacting with one another to transfer data to the mobile device 100 through animated barcodes. At block 354, the display 210 shows a barcode in a barcode series. At block 350, the mobile device 100 captures the image of the barcode being displayed. The mobile device 100 decodes the barcode and extracts the data and the associated sequence indicator for the barcode image (block 358). At block 360, for each barcode image, the mobile device 100 may also extract the total number of barcodes in the barcode series, if such information has been encoded in the barcode. Then, the mobile device 100 can determine the total number of barcodes captured or not-yet-captured in the barcode series. At block 362, the mobile device determines if all barcode images in the barcode series have been captured. If so, at block 364, the mobile device 100 displays a message to the user indicating all barcodes in the barcode series have been acquired. Then the mobile device 100 combines the extracted data from the barcodes and sequences the data according to the associated sequence indicators (block 366).

However, if all the barcode images in the barcode series have not been captured or collected by the mobile device 100, then the mobile device 100 activates the camera flash 30, as per block 368. In this way, the mobile device 100 signals the display 210 that more barcode data is needed, so that the display 210 will show a different or subsequent barcode other than the currently displayed barcode. At block 370, the light sensor 352, in communication with or on the display 210, detects the light emitted from the camera flash 30. Upon detecting the emitted light or camera flash, the display 210 then shows another (e.g. next) barcode in the barcode series (block 372).

The process repeats itself with the mobile device 100 capturing the image of the barcode being displayed (block 350). This is shown by the line connecting block 372 to block 350. The process repeats until all barcodes in the barcode series have been captured by the mobile device 100.

In another example embodiment, not shown, the above principles can be used to stream data through the display of barcodes. A display 210, having at least one animated barcode area, would continuously stream barcodes in sequential order. A mobile device 100 could scan or read the displayed barcodes and begin streaming and decoding the data on to the mobile device 100, preferably, although not necessarily, in real time. The mobile device 100 could display the streaming data, also preferably in real time. Once the mobile device 100 stops scanning the barcodes (e.g. the mobile device 100 is pointed away from the display 210), then the data streaming stops. It is noted that the mobile device 100 does not need to capture all the barcodes to stream the data. In other words, each barcode data portion is independent and can be displayed alone, or together at different times. When the mobile device 100 returns to scanning the continuously cycling barcodes, the streaming resumes. For example, in the case of a video advertisement, data could be encoded into a number of barcodes. For example, each video frame could be encoded into a barcode. The barcodes are sequentially displayed. The mobile device 100 scans the barcode and displays the frame. When the mobile device 100 scans multiple consecutive barcodes, then multiple sequential video frames are transferred to the mobile device 100. The video frames can then be displayed in sequential order (e.g. streamed), preferably in real time, on the mobile device 100. In this way a video can be streamed. Once the scanning of the barcodes stop, the streaming or playback of the video on the mobile device 100 stops as well.

Figure 20:
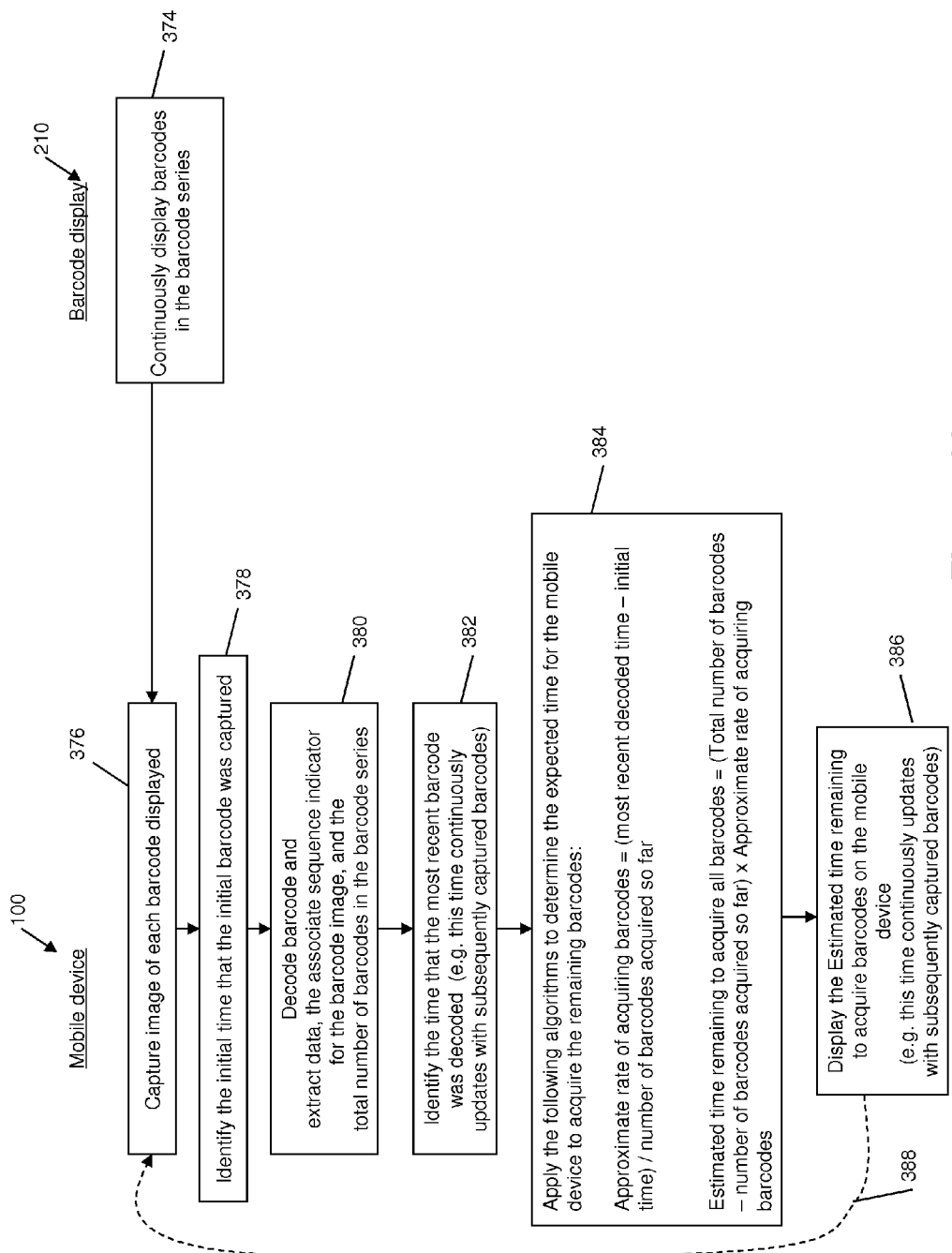
FIG. 20 is a flow diagram of example computer executable instructions for a mobile device estimating the time remaining to acquire all barcodes in a barcode series.

Another example embodiment is provided for a mobile device 100 to estimate the time remaining to acquire the remaining barcodes in a barcode series. Turning to FIG. 20, example computer executable instructions are provided for a display 210 and mobile device 100. At block 374, the display 210 continuously displays barcodes in a barcode series. At block 376, the mobile device 100 captures the image of each barcode displayed. For the initial or first barcode captured or scanned, the mobile device 100 identifies the initial time that the initial barcode was scanned (block 378). At block 380, the mobile device 100 decodes the barcode and extracts the data, the associated sequence indicator for the barcode image, and the total number of barcodes in the barcode series. In this example, the barcodes also includes the total number of barcodes in the barcode series, in addition to the sequence identification and the encoded data portion. At block 382, the time that the most recent barcode was decoded is identified. It is noted that this time parameter (e.g. most recent decoded time) continuously updates with subsequently scanned barcodes. At block 382, the mobile device 100 applies the following algorithms to determine the expected time to acquire the remaining barcodes:

> Approximate rate of acquiring barcodes=(most recent decoded time−initial time)/number of barcodes acquired so far > Estimated time remaining to acquire all barcodes= (Total number of barcodes−number of barcodes acquired so far)×Approximate rate of acquiring barcodes It can be appreciated that the parameter for the "number of barcodes acquired so far" can be determined through a counter, or other known data tracking methods. At block 386, the mobile device 100 displays the estimated time remaining to acquire barcodes, for example on its display 110. The estimated time remaining is a parameter that can also be continuously updated with subsequently captured barcodes. The above process repeats for each subsequently scanned or captured barcode, as shown in FIG. 20 by the dotted line 388. In this way, the estimated time to completing the data transfer can be determined and displayed.

It can be appreciated that the above systems and methods allow a mobile device 100 to capture and combine data portions into a final or completed data set, whereby the data size of the completed data set is larger than the amount of data able to be encoded in a single barcode.

The above principles also allow a display 210 to transfer data to a mobile device 100 at high speed transfer rates. For example, the faster the barcodes are displayed and the faster that the mobile device 100 can scan and process the barcodes, the faster the transfer rate. This approach to transferring data also does not require any kind of cellular network connection, therefore saving costs to the user. Further, this approach can be useful to transfer data when the mobile device 100 is out of cell-phone service coverage (e.g. on a subway or airplane).

Additionally, the 2D barcodes described according the above principles are now considered three-dimensional barcodes, since information is being varied along the x and y axis, as well over time. In other words, an animated barcode area (displaying 2D barcodes) is considered a three-dimensional barcode. Similarly, an animated barcode area displaying one-dimensional barcodes is considered a two-dimensional barcode (e.g. information varies along either the x axis or y axis, and along time).

The principles described herein also allow for a number of portions of data, which are numbered, to be encoded and transferred to a mobile device. If some of the portions of data are not transferred in order, or within the same time frame (e.g. some data can be scanned hours, days, weeks, etc. apart from each other), the data can still be combined since sequence identifications are provided.

The above can be applied to various scenarios, such as sporting events and subways. For example, in a sport stadium having large display screens, the display screens can display barcodes to transfer data to mobile devices 100 viewing the display screens. Similarly, in subways systems, there can be displays showing barcodes to users having mobile device 100. As described above, in such public applications, an open-loop relationship between the display 210 and the multiple mobile devices 100 allows for multiple mobile devices 100 to simultaneously scan the display 210. The display 210 does not need to coordinate the display of barcodes with different mobile devices 100 (e.g. does not need to provide feedback), since each of the mobile devices 100 are able to read and decode the barcodes, and, if necessary, combine the decoded data portions.

The steps or operations in the flow charts described herein are just for example. There may be many variations to these steps or operations without departing from the spirit of the invention or inventions. For instance, the steps may be performed in a differing order, or steps may be added, deleted, or modified.

It will be appreciated that the particular example embodiments shown in the figures and described above are for illustrative purposes only and many other variations can be used according to the principles described. Although the above has been described with reference to certain specific example embodiments, various modifications thereof will be apparent to those skilled in the art as outlined in the appended claims.

The invention claimed is:

1. A non-transitory computer readable medium comprising executable instructions for receiving data at a mobile device through barcodes, the instructions comprising:
   scanning with a barcode reader at least a first barcode and a second barcode; displaying any one of: a total number of barcodes in a barcode series wherein the barcode series includes at least the first and second barcodes; a number of barcodes that have not yet been scanned; or a combination thereof;
   decoding the first and second barcodes to respectively extract a first data portion and an associated first sequence identification, and a second data portion and an associated second sequence identification; and
   combining at least the first and second data portions according to the associated first and second sequence identifications.

2. The non-transitory computer readable medium of claim 1 wherein the barcode reader is a camera, the camera scanning each of the first and second barcodes by capturing an image of each barcode.

3. The non-transitory computer readable medium of claim 1 wherein the barcodes are two-dimensional barcodes.

4. The non-transitory computer readable medium of claim 1 wherein the instructions further comprise determining a time remaining to completely acquire the barcodes in the barcode series by:
   determining a rate at which the mobile device has previously acquired the barcodes; and
   determining a product of the number of barcodes that have not yet been scanned and the rate.

5. The non-transitory computer readable medium of claim 1 wherein the first and second data portions are combined by concatenation.

6. The non-transitory computer readable medium of claim 1 wherein the first and second barcodes are displayed on a display, and the mobile device is in an open-loop relationship with the display.

7. A mobile device, comprising:
   a barcode reader, configured to scan from a first display at least a first barcode and at least a second barcode;
   a second display for displaying any one of: a total number of barcodes in a barcode series wherein the barcode series includes at least the first and second barcodes; a number of barcodes that have not yet been scanned; or a combination thereof; and
   a processor connected to the barcode reader, and configured to at least decode the first and second barcodes to respectively extract a first data portion and an associated first sequence identification, and a second data portion and an associated second sequence identification; and combine at least the first and second data portions according to the associated first and second sequence identifications.

8. A non-transitory computer readable medium comprising executable instructions for receiving data at a mobile device through barcodes, the instructions comprising:
   scanning with a barcode reader at least a first barcode and a second barcode;
   decoding the first and the second barcodes to respectively extract a first data portion and an associated first sequence identification, and a second data portion and an associated second sequence identification;
   displaying an indication that all barcodes in a barcode series have been acquired, the barcode series including at least the first and the second barcodes; and
   combining at least the first and the second data portions according to the associated first and second sequence identifications.

9. The non-transitory computer readable medium of claim 8 wherein the barcode reader is a camera, the camera scanning each of the first and second barcodes by capturing an image of each barcode.

10. The non-transitory computer readable medium of claim 8 wherein the barcodes are two-dimensional barcodes.

11. The non-transitory computer readable medium of claim 8 further comprising determining a time remaining to completely acquire the barcodes in the barcode series.

12. The non-transitory computer readable medium of claim 11 wherein the instructions further comprising determining the time remaining by:
   determining a rate at which the mobile device has previously acquired the barcodes; and
   determining a product of a number of barcodes that have not yet been scanned and the rate.

13. The non-transitory computer readable medium of claim 8 wherein the first and second data portions are combined by concatenation.

14. The non-transitory computer readable medium of claim 8 wherein the first and second barcodes are displayed on a display, and the mobile device is in an open-loop relationship with the display.

15. A mobile device, comprising:
   a barcode reader, configured to scan from a first display at least a first barcode and at least a second barcode;
   a second display for displaying an indication that all barcodes in a barcode series have been acquired, the barcode series including at least the first and the second barcodes; and
   a processor connected to the barcode reader, and configured to at least decode the first and the second barcodes to respectively extract a first data portion and an associated first sequence identification, and a second data portion and an associated second sequence identification; and combine at least the first and the second data portions according to the associated first and second sequence identifications.

16. A non-transitory computer readable medium comprising executable instructions for receiving data at a mobile device through barcodes, the instructions comprising:
   scanning with a barcode reader at least a first barcode and a second barcode;
   decoding the first and second barcodes to respectively extract a first data portion and an associated first sequence identification, and a second data portion and an associated second sequence identification;
   determining a time remaining to completely acquire all barcodes in a barcode series, the barcode series including at least the first and second barcodes; and
   combining the first and second data portions according to the associated first and second sequence identifications.

17. The non-transitory computer readable medium of claim 16, wherein the time remaining is determined by:
   determining a rate at which the mobile device has previously acquired the barcodes; and
   determining a product of a number of barcodes that have not yet been scanned and the rate.

18. The non-transitory computer readable medium of claim 16 wherein the first and second data portions are combined by concatenation.

19. The non-transitory computer readable medium of claim 16 wherein the barcode reader is a camera, the camera scanning each of the first and second barcodes by capturing an image of each barcode.

20. The non-transitory computer readable medium of claim 16 wherein the barcodes are two-dimensional barcodes.

21. The non-transitory computer readable medium of claim 16 wherein the first and second barcodes are displayed on a display, and the mobile device is in an open-loop relationship with the display.

22. A mobile device, comprising:
   a barcode reader, configured to scan from a display at least a first barcode and at least a second barcode; and
   a processor connected to the barcode reader, and configured to at least:
      decode the first and second barcodes to respectively extract a first data portion and an associated first sequence identification, and a second data portion and an associated second sequence identification;
      determine a time remaining to completely acquire all barcodes in a barcode series, the barcode series including at least the first and second barcodes; and
      combine the first and second data portions according to the associated first and second sequence identifications.

23. A non-transitory computer readable medium comprising executable instructions for receiving data at a mobile device through barcodes, the instructions comprising:
   scanning with a barcode reader at least a first barcode and a second barcode; decoding the first and second barcodes to respectively extract a first data portion and an associated first sequence identification, and a second data portion and an associated second sequence identification; and
   concatenating the first and second data portions according to the associated first and second sequence identifications.

24. A mobile device, comprising:
   a barcode reader, configured to scan from a display at least a first barcode and at least a second barcode; and
   a processor connected to the barcode reader, and configured to at least:
      decode the first and second barcodes to respectively extract a first data portion and an associated first sequence identification, and a second data portion and an associated second sequence identification; and
      concatenate the first and second data portions according to the associated first and second sequence identifications.

25. A non-transitory computer readable medium comprising executable instructions for receiving data at a mobile device through barcodes, the instructions comprising:
   scanning with a barcode reader at least a first barcode and at least a second barcode, whereby the barcodes are shown on a display;
   displaying an indicator of progress associated with scanning the at least first and second barcodes;
   decoding the at least first and second barcodes to extract a first data portion and an associated first sequence identification, and a second data portion and an associated second sequence identification; and
   combining the first and second data portions according to the associated sequence identifications.

26. The non-transitory computer readable medium of claim 25 wherein the display is in an open-loop relationship with the mobile device.

27. The non-transitory computer readable medium of claim 25 wherein the barcode reader is a camera, the camera scanning each of the barcodes by capturing an image of each barcode.

28. The non-transitory computer readable medium of claim 25, wherein the barcodes are two-dimensional barcodes.

29. The non-transitory computer readable medium of claim 25, wherein the indicator comprises a number of barcodes scanned.

30. The non-transitory computer readable medium of claim 25, wherein the at least first barcode and the at least second barcode are part of a barcode series, whereby the respective data portions from all the barcodes in the barcode series are able to be combined to form a complete data set.

31. The non-transitory computer readable medium of claim 30 further comprising the mobile device extracting a total number of barcodes in the barcode series.

32. The non-transitory computer readable medium of claim 31, wherein the indicator comprises any one of: the total number of barcodes in the barcode series; the number of barcodes that have not yet been scanned; or the combination thereof.

33. The non-transitory computer readable medium of claim 31, wherein the indicator comprises, upon the mobile device scanning and decoding all the barcodes in the barcode series, an indication that all the barcodes have been acquired.

34. The non-transitory computer readable medium of claim 31 further comprising
determining a time remaining to completely acquire the barcodes in the barcode series by:
determining a rate at which the mobile device has previously acquired the barcodes; and
determining a product of the number of barcodes that have not yet been scanned and the rate.

35. The non-transitory computer readable medium of claim 25, wherein the data portions are combined by concatenating the data portions in sequential order according to the associated sequence identifications.

36. A non-transitory computer readable medium comprising executable instructions for transferring data from a display to one or more mobile devices, the instructions comprising:
displaying one or more barcode areas according to one or more display modes, each barcode area continuously displaying two or more barcodes one at a time, each barcode including an encoded data portion and an associated sequence identification for combining the data portion from each barcode; and
wherein, the barcodes are able to be scanned by one or more mobile devices.

37. The non-transitory computer readable medium of claim 36, wherein the one or more mobile devices and the display are in an open-loop relationship.

38. The non-transitory computer readable medium of claim 36, wherein the one or more display modes include showing at least two barcode areas, the barcode areas simultaneously displaying barcodes.

39. The non-transitory computer readable medium of claim 36, wherein the barcodes are part of a barcode series, whereby the respective data portions from all the barcodes in the barcode series are able to be combined to form a complete data set.

40. The non-transitory computer readable medium of claim 39, wherein the one or more display modes include at least two barcode areas, the barcode areas simultaneously displaying barcodes belonging to the same barcode series.

41. The non-transitory computer readable medium of claim 40, wherein each of the barcode areas are synchronized to simultaneously display the same barcodes.

42. The non-transitory computer readable medium of claim 40, wherein each of the barcode areas simultaneously display different barcodes from each other.

43. The non-transitory computer readable medium of claim 40, wherein each of the barcode areas is associated with a different display setting for displaying barcodes, the display settings including any one of: contrast, brightness, resolution, and rate at which the barcodes in the respective barcode area are continuously cycled.

44. The non-transitory computer readable medium of claim 40, wherein the barcode series comprises two or more sets of barcodes, one set of barcodes displayed in one barcode area, and a different set of barcodes shown in another barcode area.

45. A display device, comprising:
a display, configured to display barcodes that are able to be scanned by one or more mobile devices; and
a processor connected to the display, and configured to at least operate using one or more display modes showing one or more barcode areas, each barcode area continuously displaying two or more barcodes one at a time, each barcode including an encoded data portion and an associated sequence identification for combining the data portion from each barcode.

* * * * *